United States Patent

Tomiyasu et al.

[15] 3,640,135
[45] Feb. 8, 1972

[54] DEVICE FOR MEASURING FLOW RATES OF POWDERY AND GRANULAR MATERIALS

[72] Inventors: Hiroshi Tomiyasu; Tsuguya Inagaki, both of No. 162-2, Nagao, Kawasaki-shi, Kanagawa-ken; Hiroshi Kajiura, No. 22-7, 2-chome, Nishiazabu, Tokyo; Kinnosuke Watanabe, No. 1948-11, Hosoyama, Kawasaki-shi, Kanagawa-ken, all of Japan

[22] Filed: Oct. 10, 1968

[21] Appl. No.: 766,515

[52] U.S. Cl. ..................................................73/228
[51] Int. Cl. ................................................G01f 1/00
[58] Field of Search .......................................73/228

[56] References Cited

UNITED STATES PATENTS 1,401,299  12/1921  Wohlenberg ............................73/228
3,232,486  2/1966  Ofner .....................................73/228 X

FOREIGN PATENTS OR APPLICATIONS 804,211  11/1958  Great Britain ..........................73/228

*Primary Examiner*—Jerry W. Myracle
*Attorney*—Steinberg & Blake

[57] ABSTRACT

A method of measuring the flow rates of powdery and granular materials which comprises allowing a powdery or granular material to drop naturally by gravity from a certain height onto a detecting plate and then measuring the horizontal component of the force given to said plate as an impact load, and instruments for practicing the method.

7 Claims, 3 Drawing Figures

PATENTED FEB 8 1972

3,640,135

INVENTORS
HIROSHI TOMIYASU, TSUGUYA INAGAKI,
HIROSHI KAJIURA and KINNOSUKE WATANABE
BY Stenley & Blake
ATTORNEYS

DEVICE FOR MEASURING FLOW RATES OF POWDERY AND GRANULAR MATERIALS

This invention relates to a method of measuring the flow rates of powdery and granular materials and instruments therefor.

A principal object of the invention is to permit flow measurement with extreme accuracy. Another important object is to provide instruments of this type which are easily embodied and function accurately and reliably.

These and other objects and advantages of the present invention will be better understood from the following detailed description taken in conjunction with the accompanying drawing, in which.

The present invention is characterized in that the horizontal impact load rather than the vertical component of the load of a naturally dropped mass against a detecting plate is taken out and determined.

Figure 1:
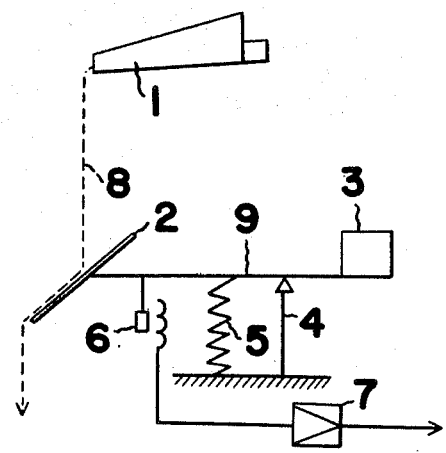
FIG. 1 is a diagrammatic view of an impact flow meter of the type known in the art for measuring the flow rates of powdery and granular materials.

Conventional impact flow meter, as shown in FIG. 1, is so constructed that a powdery of granular material naturally dropped from a feed means 1 hits against a detecting plate 2 before it flows further downward, and the resulting impact load, or vertical load, is converted into a displacement of a beam 9 that is supported by a fulcrum 4, through a spring 5 and a differential transformer 6, and the amount of displacement in turn is converted into an electrical signal, which is subsequently amplified by an amplifier 7 for easier measurement. Therefore, any bit of the powdery or granular material stuck and deposited on the detecting plate 2 would give an effect as if the impact load has increased, thus producing an error accordingly in the measured value.

In view of this, the method and instrument for impact flow measurement in accordance with the present invention preclude the possibility of any solid deposit being measured erroneously as part of the flow rate.

For the practice of the present invention two preferred embodiments will be described hereunder.

Figure 2:
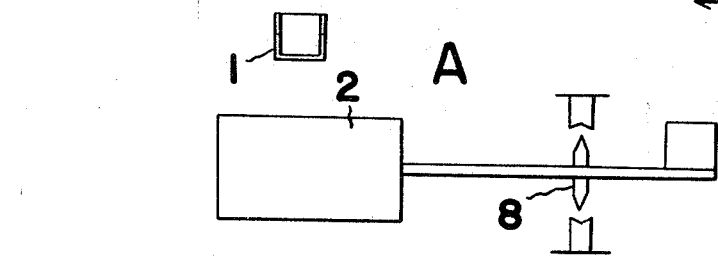
FIG. 2 shows diagrammatic views of one embodiment of the invention, A being a front elevational view and B a top plan view.
Figure 2:
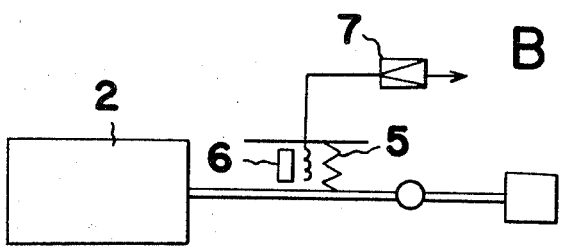

To illustrate the first embodiment by reference to the accompanying drawing, specifically to FIG. 2, a beam 9 which carries a detecting plate 2 is supported by a fulcrum 8, and the detecting plate 2 is provided with an inclination parallel to the beam and made horizontal component of force of impact load against the detecting plate 2 can be converted into a displacement, which in turn is converted into an electrical signal through a spring 5 and a differential transformer 6 both provided horizontally, and subsequently the electrical signal is fed to an amplifier 7.

With such construction, only the horizontal component of the force applied as impact load against the detecting plate is measured. Since any deposit of powdery or granular material on the detecting plate will not produce any error in the reading, the flow rate of the subject material can be measured with a very high degree of accuracy.

Figure 3:
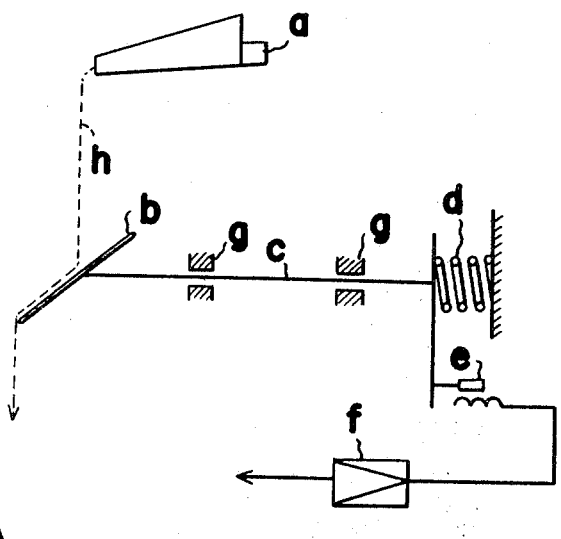
FIG. 3 is a diagrammatic front elevational view of a second embodiment of the invention.

The second embodiment is designed to measure the component of force given in the longitudinal direction of the beam by a powdery or granular material allowed to drop by gravity onto the detecting plate which is provided on the beam with an inclination with respect to the supporting beam. Referring specifically to FIG. 3, the beam $c$ is equipped with the detecting plate $b$ diagonally at one end thereof and is made horizontally movable by means of a spring $d$ provided at the other end and of journals $g$ provided intermediate of its length. As a flow of powdery or granular mass $h$ dropping naturally by gravity from a feed means $a$ is received by the detecting plate $b$, the beam is urged toward the direction indicated by an arrow, while compressing the spring $d$, by the axial component of force which is exerted upon the beam $c$ depending upon the momentum of the impact against the detecting plate. This displacement of the beam is transmitted through the spring and a differential transformer $e$ to an amplifier $f$ where it is converted into an electrical signal which in turn gives a reading of the measured value of the flow rate.

With this embodiment an extremely accurate measurement of flow rate is made possible because here again any sticking and deposition of powdery or granular material on the detecting plate cannot cause an error in measurement.

It is apparent from the above description that with the present invention the inclined detecting plate has its upwardly directed surface inclined both with respect to horizontal and vertical axes, so that when the falling material engages the detecting plate a horizontal component of force will be produced. The beam of each embodiment forms a carrier means carrying the detecting plate while each embodiment includes a support means supporting the carrier means only for movement in a horizontal plane. Thus, in the case of FIG. 2, the pivot 8 forms a support means supporting the beam or carrier means only for movement about a vertical axis so that the carrier means remains at all times in a given horizontal plane. In the case of FIG. 3, the bearings $g$ form a support means supporting the beam or carrier means only for longitudinal movement while it remains in the same horizontal plane. The spring 5 of FIG. 2 and the spring $d$ of FIG. 3 form a means yieldably opposing the movement of the carrier means in a horizontal plane, and the differential transformer of each embodiment forms a measuring means for measuring the extent of movement of the carrier means in the horizontal plane.

We claim:

1. In a device for measuring the flow of granular material, a detecting plate having an upwardly directed surface inclined both with respect to horizontal and vertical directions so that granular material falling onto said surface will provide a horizontal component of force on said detecting plate, carrier means carrying said plate, said carrier means being in the form of an elongated beam having a free end carrying said detecting plate, support means supporting said carrier means for movement only in a horizontal plane, said support means being located in its entirety along said beam only to one side of and spaced from said detecting plate, means yieldably opposing movement of said carrier means in said horizontal plane, and measuring means operatively connected with said carrier means for measuring the extent of movement thereof in said horizontal plane in response to the magnitude of said horizontal component.

2. The combination of claim 1 and wherein said support means supports said beam for horizontal movement about a vertical axis.

3. The combination of claim 2 said support means including a vertical pivot which supports said beam for swinging movement in said horizontal plane about said vertical axis.

4. The combination of claim 1 and wherein said support means supports said beam for longitudinal movement in said horizontal plane.

5. The combination of claim 4 said support means including bearings engaging said beam and supporting the latter only for longitudinal movement.

6. The combination of claim 1 and wherein said means opposing movement of said carrier means is in the form of a spring.

7. The combination of claim 1 and wherein said measuring means is in the form of a differential transformer.

* * * * *